United States Patent
Bowers, III

(10) Patent No.: US 10,352,956 B2
(45) Date of Patent: Jul. 16, 2019

(54) AUTOMATIC THRESHOLD DETECTION FOR TACHOMETER SIGNALS

(71) Applicant: CSI Technology, Inc., Wilmington, DE (US)

(72) Inventor: Stewart V. Bowers, III, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 976 days.

(21) Appl. No.: 14/296,480

(22) Filed: Jun. 5, 2014

(65) Prior Publication Data

US 2014/0372071 A1    Dec. 18, 2014

Related U.S. Application Data

(60) Provisional application No. 61/835,684, filed on Jun. 17, 2013.

(51) Int. Cl.
| | |
|---|---|
| *G01P 3/481* | (2006.01) |
| *G01H 1/00* | (2006.01) |
| *G01P 3/00* | (2006.01) |

(52) U.S. Cl.
CPC .............. *G01P 3/481* (2013.01); *G01H 1/003* (2013.01)

(58) Field of Classification Search
CPC ................................. G01P 3/481; G01H 1/003
See application file for complete search history.

(56) References Cited

U.S. PATENT DOCUMENTS

| | | | |
|---|---|---|---|
| 3,822,402 A | 7/1974 | Vest | |
| 4,228,396 A | 10/1980 | Palombo et al. | |
| 5,059,901 A * | 10/1991 | Van Voorhis | G01P 3/486 |
| | | | 250/231.13 |
| 5,290,205 A * | 3/1994 | Densmore | A63B 22/0257 |
| | | | 482/54 |
| 5,369,344 A | 11/1994 | Mezzatesta et al. | |
| 5,744,723 A | 4/1998 | Piety | |
| 6,087,796 A | 7/2000 | Canada et al. | |
| 6,234,487 B1 | 5/2001 | Shoemaker, Jr. | |
| 6,618,128 B2 | 9/2003 | Van Vorhis et al. | |
| 7,142,125 B2 | 11/2006 | Larson et al. | |
| 8,368,329 B1 | 2/2013 | Depew et al. | |
| 2004/0133394 A1 | 7/2004 | Huang et al. | |

(Continued)

*Primary Examiner* — Manuel A Rivera Vargas
*Assistant Examiner* — Yaritza H Perez Bermudez
(74) *Attorney, Agent, or Firm* — Luedeka Neely Group, P.C.

(57) ABSTRACT

A method is described for automatically determining a proper threshold for a tachometer signal in order to produce desired tachometer pulses necessary for analysis of machine vibration data. A tachometer signal is low-pass filtered to exclude high frequency noise and a running derivative of the filtered tachometer waveform is taken to create a derivative waveform. Another waveform is created that includes only positive values from the derivative waveform that correspond to positive values in the low-pass filtered tachometer waveform. In general, a tachometer signal has the greatest derivative value (slope) when a tachometer pulse is present. Based on this observation, a threshold value is determined using both the low-pass filtered tachometer waveform and the positive-value derivative waveform along with statistics from both waveforms.

11 Claims, 4 Drawing Sheets

(56) References Cited

U.S. PATENT DOCUMENTS

2007/0073521 A1\* 3/2007 Carle ................. G05B 23/0229
   702/188
2008/0177485 A1\* 7/2008 Cohen ................... F01D 21/003
   702/56

\* cited by examiner

… … …

AUTOMATIC THRESHOLD DETECTION FOR TACHOMETER SIGNALS

RELATED APPLICATIONS

This nonprovisional patent application claims priority to U.S. provisional patent application Ser. No. 61/835,684, filed Jun. 17, 2013, titled "Automatic Threshold Detection for Tachometer Signals," the entire contents of which are incorporated herein by reference.

FIELD

This invention relates to analysis of machine vibration data. More particularly, this invention relates to a method for automatically determining a proper threshold for a tachometer signal in order to produce the desired tachometer pulses necessary for analysis of machine vibration data.

BACKGROUND

One of the most important characteristics of machine operation used in the analysis of vibration data is the rotational speed of the machine. Machine speed is often acquired from tachometer measurements. Accurate tachometer pulses are essential for applications such as order tracking, synchronous time averaging, single channel phase, Bode plots, and general turning speed calculations. Ideally, tachometer pulses are generated when illumination from a tachometer sensor passes over a section of reflective tape placed on a rotating portion of the machine, such as a rotating shaft. However, the shafts of most machines in industry do not have reflective tape. If they have reflective tape, often times the tape is covered with grime or has rubbed off or is otherwise damaged to some extent. Because a machine typically cannot be stopped in order to place reflective tape on the shaft, an analyst will collect tachometer data in hopes of getting a trigger from a keyway, a scratch on the shaft, or remnants of old reflective tape. The resulting tachometer waveform is typically noisy and small in amplitude and the tachometer pulses are not very distinctive.

An ideal tachometer waveform consists of a series of distinct pulses, wherein each pulse indicates a single revolution of the shaft. To generate a tachometer pulse sufficient for the applications mentioned above, a threshold is set such that a rising (or falling) edge of the tachometer signal triggers a pulse when it passes the threshold. This threshold is manually entered by an analyst. In an ideal situation, where reflective tape is present resulting in a strong tachometer signal, the chosen threshold value will generally be acceptable for all measurements. However, when reflective tape is not present, the level of the tachometer signal varies from one machine to the next and the necessary threshold will be different for each measurement.

What is needed, therefore, is an automatic method for calculating a proper threshold for a given tachometer signal in order to produce the desired tachometer pulses needed for machine vibration analysis.

SUMMARY

The various embodiments of the invention described herein extract an event from data. The data of interest is generally characterized by a rapid change in a signal amplitude. By applying a derivative to the signal, these rapid changes in amplitude become more evident and are much easier to see and quantify. When evaluating tachometer signals associated with a machine being monitored, the rapid change in signal amplitude occurs at a rate substantially equivalent to the running speed of the machine. Such tachometer signals may be generated by various sources, including but not limited to laser, optical, eddy current, magnetic, and LED sources.

Embodiments of the invention can also be applied to vibration signals having repetitive and impulsive features. One example of an impulsive signal is a signal associated with a bearing defect. By taking the derivative of an acceleration waveform (sometimes referred to as a "jerk"), a threshold value can be calculated using an embodiment of the invention that extracts a repetitive signal associated with the impulsive characteristic generated from a defective bearing. Embodiments of the invention may be applied to any vibration waveform to extract information associated with impulse-driven information.

A preferred method embodiment begins by passing a tachometer signal through a low-pass filter to exclude high-frequency noise. Preferably, the low-pass corner frequency of the filter is 250 Hz, but depending on the signal the desired corner frequency may vary between 100 Hz and 1000 Hz. Next, a running derivative of the filtered tachometer waveform is taken. The resulting signal is referred to herein as the derivative waveform ("Deriv_WF"). A new waveform is then created that includes only positive values from the derivative waveform that correspond to positive values in the associated low-pass filtered tachometer waveform. This new waveform is referred to herein as Deriv>0_WF. In general, a tachometer signal has the greatest derivative value (slope) when a tachometer pulse is present. Based on this observation, preferred embodiments of the method derive a threshold value using both the low-pass filtered tachometer waveform and Deriv>0_WF along with statistics from both waveforms. In alternative embodiments, a Deriv<0_WF waveform is derived using only negative values in the associated low-pass filtered tachometer waveform. A negative threshold value may be calculated for negative going pulses such as generated by proximity probe tachometers.

In preferred embodiments, determination of the tachometer threshold value is based on finding a specified number of peaks in the Deriv>0_WF waveform and locating their associated peaks in the low-pass filtered tachometer waveform. Using a combination of statistics derived from both waveforms, one of three options will be selected:
 (1) a threshold is determined for the low-pass filtered waveform, which in turn is used to produce tachometer pulses;
 (2) although the low-pass filtered waveform does not provide a sufficient signal to produce a tachometer pulse, the associated Deriv>0_WF waveform does provide the information needed and therefore a threshold is calculated and applied to the Deriv>0_WF waveform that is used to generate tachometer pulses;
 (3) neither the low-pass filtered waveform nor Deriv>0_WF contains the necessary characteristics to produce a reliable tachometer pulse and the analyst is warned that the acquired signal is insufficient to generate tachometer pulses.

Preferred embodiments of the method include:
 (1) three different methods to determine peaks in the Deriv>0_WF;
 (2) the ability to sort out peak values that are not consistent with peak values associated with the running speed;

(3) determination of the threshold value based on various statistical criteria.

Peaks representative of tachometer pulses in the raw tachometer waveform are determined from the peaks found in the Deriv>0_WF waveform. The Deriv>0_WF waveform consists of subsets or groups of positive peak values. (For example, in FIG. 4, such a group (or subset) contains all the peaks found between "A" and "E." Another group contains the single peak between "F" and "G.") In some embodiments of the method, the peaks in Deriv>0_WF are found as the first peak of a group of positive peak values. In alternative embodiments, the selected peaks in Deriv>0_WF correspond to either the largest derivative value or the last peak from each group of peak values. To ensure that the selected set of Deriv>0_WF peaks are associated only with the speed of the machine, outlying peaks are culled out using a sorting routine described hereinafter. This routine preferably includes four methods to determine the selected peaks based on calculations of the mean and standard deviation of the set of peaks.

Alternative embodiments of the method may employ a different statistical process, such as a mode, to find a frequently recurring family of peaks within the derivative waveform. For example, a statistical histogram, a cumulative distribution, or another probability density technique may be implemented to detect and identify a range of interest based on a mode or a most frequently recurring subset of data values within a population of data values from the derivative waveform.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
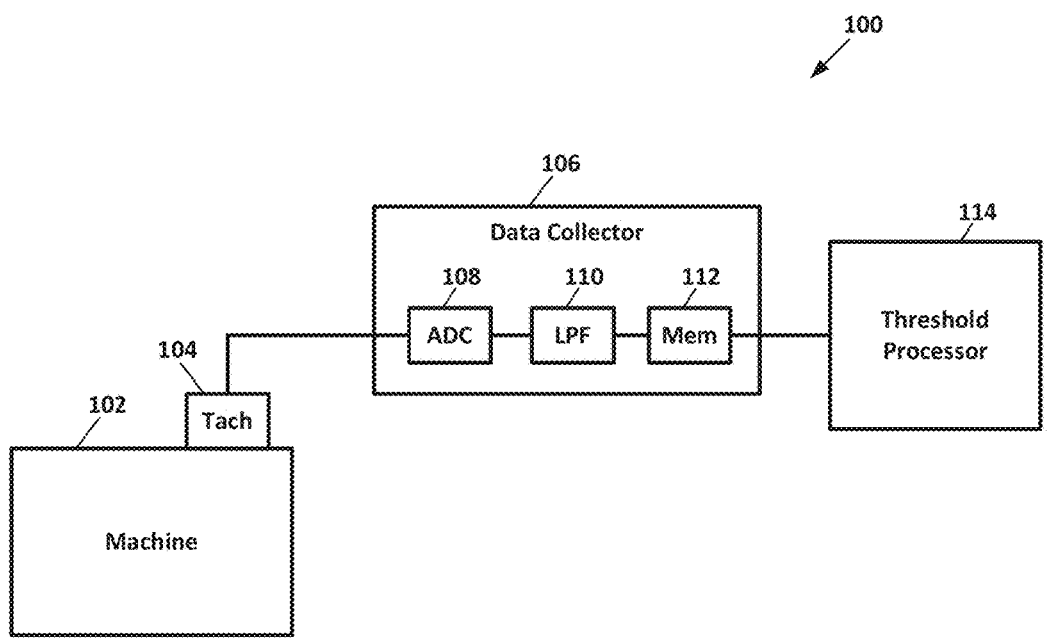
FIG. 1 depicts a functional block diagram of a system for deriving information from a tachometer signal according to an embodiment of the invention.

FIG. 1 depicts a system 100 for deriving information from a tachometer signal. In the embodiment of FIG. 1, a tachometer 104 is attached to a machine 102 to monitor the rotational speed of a component of the machine 102, such as a rotating shaft. The tachometer 104 generates a tachometer signal that contains information about the rotational speed of the machine 102. The tachometer signal is provided to a data collector 106 comprising an analog-to-digital converter (ADC) 108 for sampling the tachometer signal, a low-pass filter 110, and buffer memory 112. The data collector 106 may be a digital data recorder manufactured by TEAC or a vibration data collector. In a preferred embodiment, the ADC 108 samples the tachometer signal at 48,000 samples/second. The low-pass filter 110 is preferably an FIR filter with 49 taps, preferably with a corner frequency set between 250 and 1000 Hz. In a preferred embodiment, the low-pass corner frequency is set at 250 Hz for rotational speeds of 900 RPM and higher.

In the embodiment of FIG. 1, the tachometer signal data is transferred from the data collector 106 to a threshold processor 114 that performs the calculations and other information processing tasks described herein. In an alternative embodiment, the calculations and processing are performed by a processor in the data collector 106.

Figure 2:
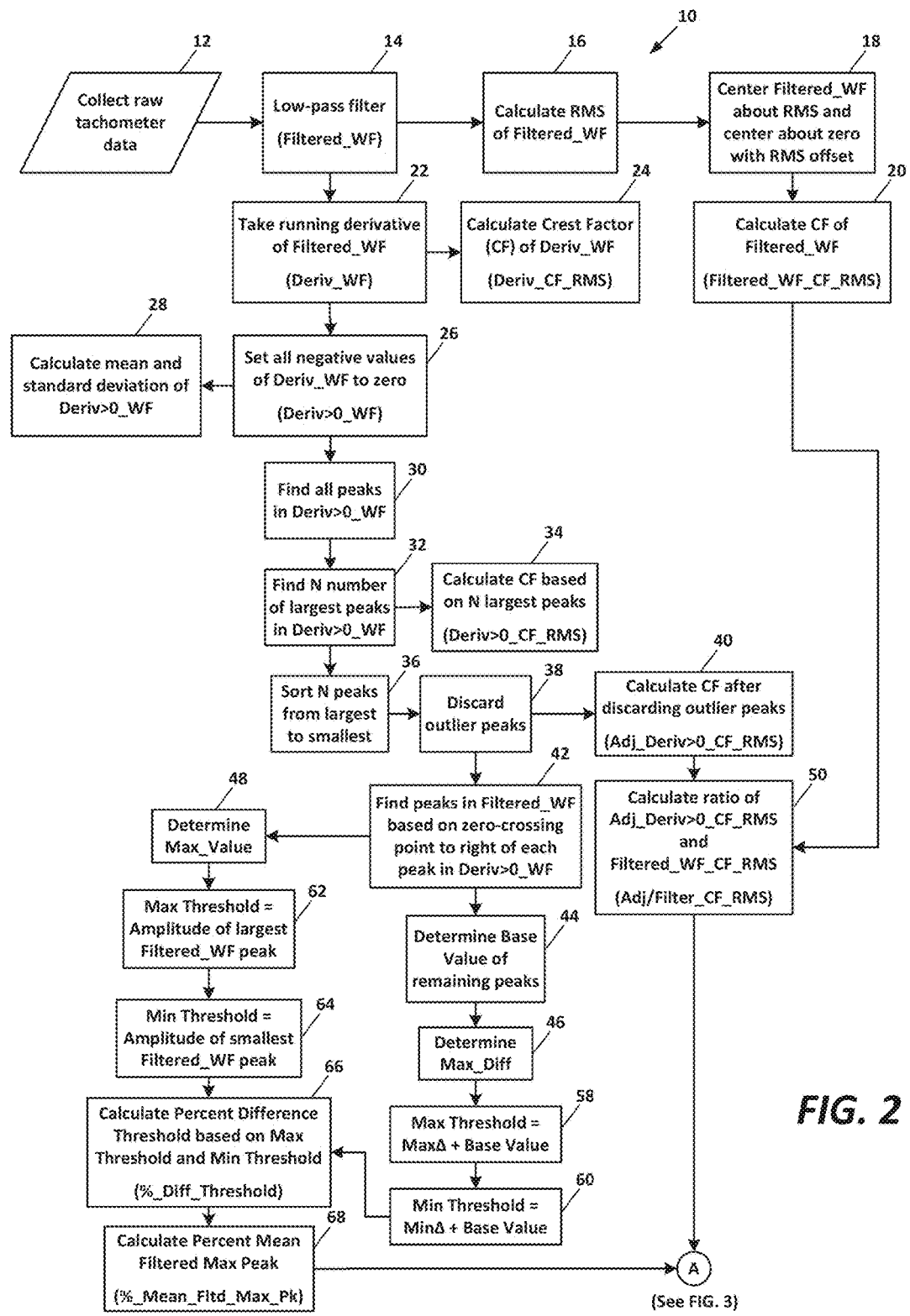
FIGS. 2 and 3 depict flowcharts of steps of a method for determining a threshold for a tachometer signal according to a preferred embodiment of the invention.

As depicted in FIG. 2, a preferred method 10 for determining a threshold for a tachometer signal begins with the collection of the raw tachometer data (step 12). The tachometer signal data is passed through the low-pass filter 110 (step 14), which generates a filtered signal at its output referred to herein as "Filtered_WF."

Once Filtered_WF is stable (after about the $50^{th}$ sample), the root-mean-square (RMS) value of Filtered_WF is calculated (step 16), and the waveform is centered about the RMS value and then centered about zero with the RMS offset (DC offset) (step 18). The Crest Factor (CF) for Filtered_WF is then calculated according to:

$$CF = \frac{\text{Largest peak of Filtered\_WF}}{\text{RMS of Filtered\_WF}}. \quad (\text{step 20})$$

This value is referred to herein as Filtered_WF_CF_RMS.

A running derivative of Filtered_WF is taken which is referred to as the Deriv_WF signal (step 22), wherein the zero value derivative point at the beginning is dropped. The Crest Factor (CF) for the Deriv_WF signal is calculated according to:

$$CF = \frac{\text{Largest peak of Deriv\_WF}}{\text{RMS of Deriv\_WF}}. \quad (\text{step 24})$$

This value is referred to as Deriv_CF_RMS.

Using the Deriv_WF signal, a new waveform is created from the positive values in Filtered_WF that have only the positive derivative values (slopes). The new waveform retains all values that are greater than zero while setting all negative values (i.e. slope≤0) to zero (step 26). The resulting signal, referred to herein as Deriv>0_WF, looks like a "rectified" version of Deriv_WF, although this waveform is not actually rectified. Specifically, values greater than zero in Filtered_WF are determined, the slope of the resulting signal is calculated, and any slopes that are less than or equal to zero are set to zero. The mean value (μ) of the resulting signal is found and referred to as Deriv>0_Mean, and the standard deviation (σ) is found and referred to as Deriv>0_SD (step 28). In the preferred embodiment, values of zero are not used to calculate Deriv>0_Mean and Deriv>0_SD. In some embodiments, Deriv>0_WF is created in an opposite manner using only the negative slope of Deriv_WF, and the absolute value is taken of the resulting signal for further analysis.

Figure 4:
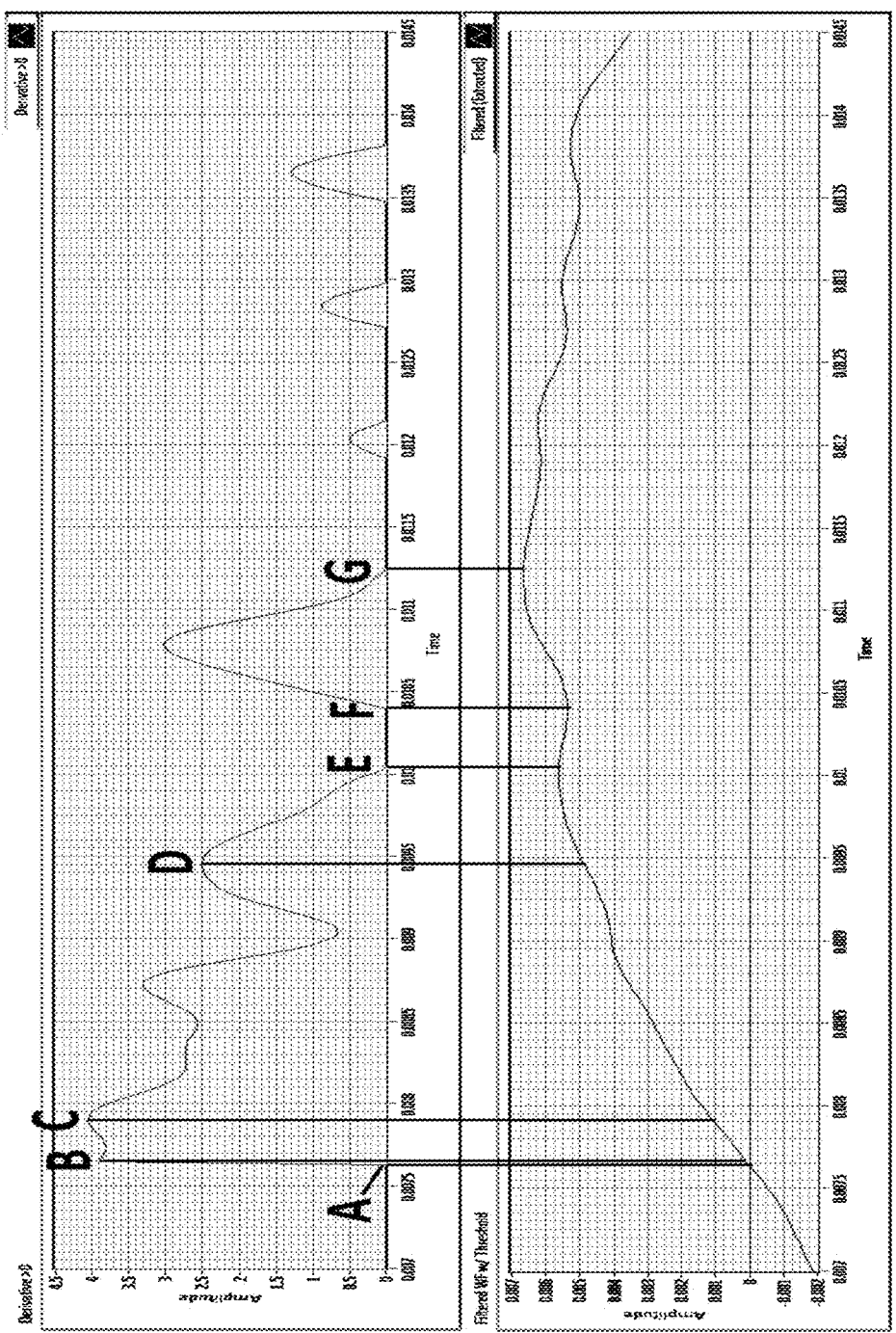
FIG. 4 depicts a portion of an example filtered tachometer waveform and a corresponding running derivative waveform.

The upper portion of FIG. 4 depicts an example of Deriv>0_WF showing a set of peaks starting after 0.0075 seconds (point "A") and ending just after 0.01 seconds (point "E"). The lower portion of FIG. 4 is the corresponding Filtered_WF that was used to produce Deriv>0_WF in the upper portion. The vertical lines show the derivative (slope) values associated with points in Filtered_WF.

In a preferred embodiment, all peaks in Deriv>0_WF are found by one of three methods (step 30). Each method evaluates every group of points defined as a set of points (positive derivatives) bounded by zero:
1. The first peak in each set is evaluated. In this method, the peak is the first peak of the set where the peak is the most positive value before becoming less positive. For example, see point "B" in FIG. 4.
2. Choose the "steepest" slope or largest derivative. This will be the tallest peak in each set. The tallest peak is associated with the steepest slope in the set. For example, see point "C" in FIG. 4.
3. Choose the last peak in the set. This point is associated with the steepest slope of the line just before the peak occurs in Filtered_WF. For example, see point "D" in FIG. 4.

The N number of largest peaks are then found in Deriv>0_WF (step 32). The value of N can be user-selected or calculated as described in a process performed in a preferred embodiment to calculate the number of peaks for analysis. Typically, N is 20 for one second of data at speeds greater than 1800 RPM. The largest of these N peaks is found and the Crest Factor (CF) for the Deriv>0_WF data is determined according to:

$$CF = \frac{\text{Largest of } N \text{ peaks of } Deriv > 0\_WF}{\text{RMS of } Deriv > 0\_WF}. \quad \text{(step 34)}$$

This value is referred to as Deriv>0_CF_RMS. When calculating the RMS value of the Deriv>0_WF, values of zero are included.

The N peaks found in step 32 are sorted by amplitude from largest to smallest (step 36), and any of the N peaks greater than the boundary of μ+σ are discarded as outliers (step 38). A statistical method used in a preferred embodiment to discard the outlier data is described in hereinafter (method 2). A Crest Factor for the remaining values is calculated according to:

$$CF = \frac{\text{Largest of } N \text{ peaks of } Deriv > 0\_WF \text{ excluding\_outliers}}{\text{RMS of } Deriv > 0\_WF\_\text{excluding\_outliers}}. \quad \text{(step 40)}$$

This value is referred to as Adj_Deriv>0_CF_RMS. Preferably, the RMS calculation used for the Adj_Deriv>0_CF_RMS value does not incorporate the discarded peak values.

Next locations in Deriv>0_WF are determined where the signal crosses zero to the right of the peaks (FIG. 4, points "E" and "G") (step 42). These locations coincide with a peak in the Filtered_WF signal. The "base" value of Deriv>0_WF is then determined for each of the N peaks found in step 32 (step 44). This base value is preferably associated with the zero crossing of the Filtered_WF signal as indicated by point "A" in FIG. 4 or at a value where the derivative (slope) changes from negative to positive, such as point "F" in FIG. 4 which corresponds to a valley in the Filtered_WF data where the derivative changes from negative to positive.

In preferred embodiments, the analysis used for threshold calculations is based on Filtered_WF data using either of two methods:
1. Using the difference between the Filtered_WF peak values determined in step 42 and the Filtered_WF values associated with the "base" value of Deriv>0_WF found in step 44. This difference is referred to as "Max_Diff" (step 46).
2. Using the Filtered_WF peak values associated with the Deriv>0_WF values found in step 42. This value is referred to as "Max Value" (step 48).

The ratio of the CF values found in steps 40 and 20 is expressed as:

$$Adj/\text{Filter\_CF\_RMS} = \frac{(\text{Adj\_Deriv} > 0\_\text{CF\_RMS})}{(\text{Filtered\_WF\_CF\_RMS})}. \quad \text{(step 50)}$$

If Adj/Filter_CF_RMS is greater than or equal to three (step 52) and no maximum peaks were discarded in Deriv>0_WF (step 53), then the Deriv>0_WF waveform is used as the signal from which tachometer pulses are derived. The tachometer signal threshold (step 54) is calculated from the Deriv>0_WF waveform. If maximum peaks were discarded in Deriv>0_WF (step 53), then a "bad data" indication is generated (step 55). If Adj/Filter_CF_RMS is less than three (step 52), then the Filtered_WF waveform is used to create tachometer pulses and as a basis to set the tachometer signal threshold (step 56). Whichever waveform is used to set the threshold is referred to herein as the "decision WF."

Calculation of Threshold Value

The set of amplitudes (values) of the decision WF used to calculate the threshold limit are preferably within μ±2σ, where the mean and standard deviation are calculated from the set of values used in calculating Max_Diff and Max_Value (steps 46 and 48). Details of a statistical method for discarding data outside the limits is described hereinafter (Method 3 with n=2).

For calculations related to Max_Diff:

Max_Threshold=Max Δ+Base Value (step 58); and

Min_Threshold=Min Δ+Base Value (step 60)

where
Δ=change (difference value) from the peak in the Filtered_WF waveform and the closest left-most base value; and
Base value=amplitude value at a position in the Filtered_WF waveform where the slope changes from ≤zero to positive.

Min_Threshold can be greater than Max_Threshold because the MaxΔ value could have a small base value compared to Min Δ which could have an associated large base value.

For calculations related to Max_Value:

Max_Threshold=Amplitude of the largest peak taken from the sorted "N" peaks extracted from Filtered_WF (step 36) with Base Value=0 (step 62); and Min_Threshold=Amplitude of the smallest peak taken from the sorted "N" peaks extracted from the Filtered_WF (step 36) with Base Value=0 (step 64).

Calculation of the Percent Difference Threshold (referred to herein as %_Diff_Threshold) indicates how much the difference between two values change from the average:

Percent Difference Threshold = (step 66)

$$\frac{(Max\_Threshold) - (Min\_Threshold)}{\left(\frac{(Max\_Threshold) + (Min\_Threshold)}{2}\right)}.$$

The Percent Mean Filtered Max Peak (referred to herein as %_Mean_Fltd_Max_PK) is the percent change in the amplitude values of the maximum peaks in the Filtered_WF data:

$$\%\_Mean\_Fltd\_Max\_PK = \left[1 - \left(\frac{\mu - \sigma}{\mu}\right)\right] * 100\%. \quad \text{(step 68)}$$

This parameter is the percent mean taken from the "N" maximum peaks of the Filtered_WF data, where N is either a user-selected number of peaks or is calculated as described hereinafter in a process that calculates the number of peaks for analysis. The mean and standard deviation are calculated for the set of maximum peak values taken from the Filtered_WF data.

If %_Mean_Fltd_Max_PK from step 68 is larger than ten, then the data is considered "questionable." This means the data "jumps" around too much and it is difficult, if not impossible, to set a realistic threshold. A threshold can still be calculated but will probably not be useful.

Figure 3:
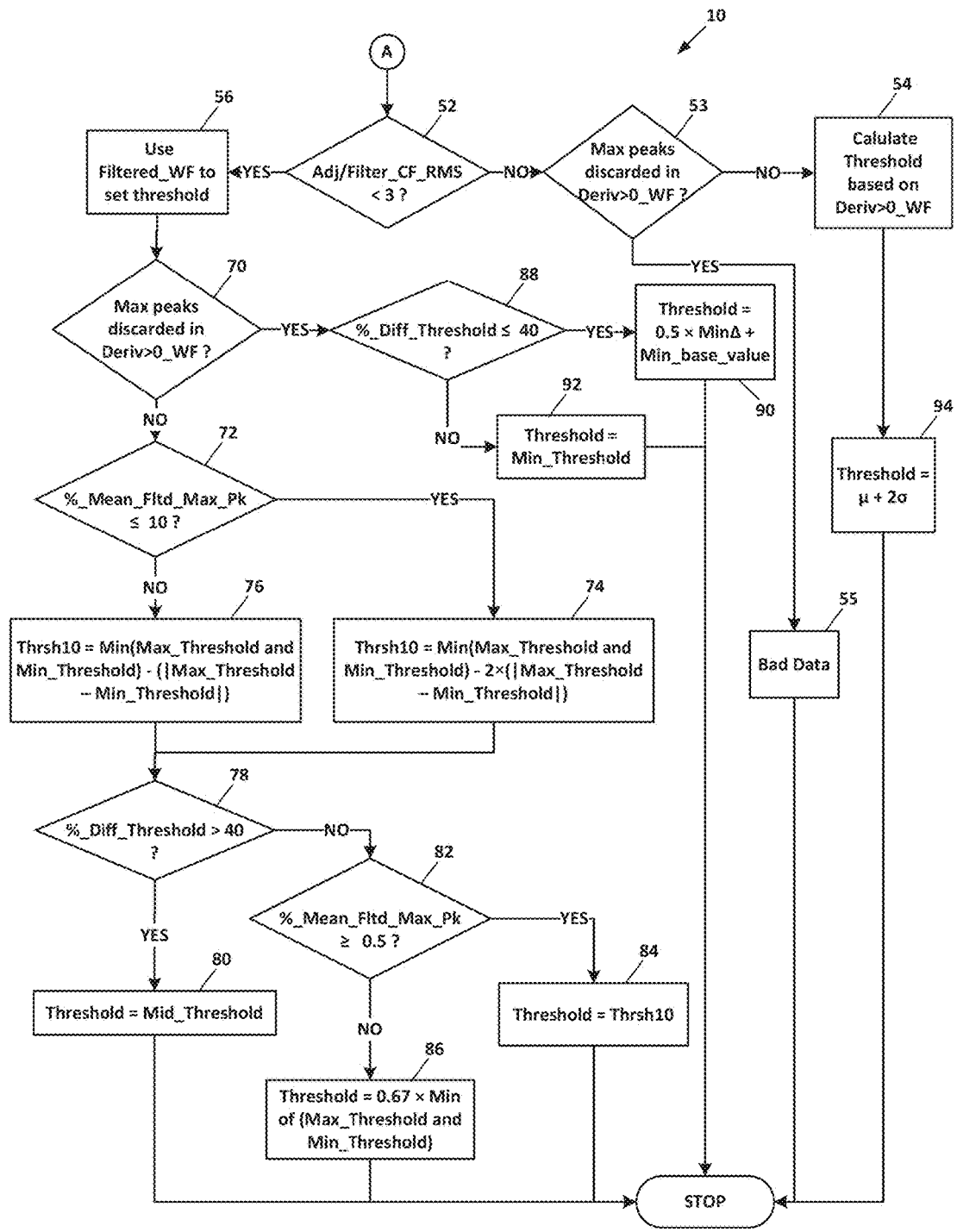

As shown in FIG. 3, if Adj/Filter_CF_RMS from step 50 is less than three (step 52) and no peaks were discarded from the statistical analysis of the maximum peaks in Deriv>0_WF (step 70), then the method proceeds to evaluate the magnitude of %_Mean_Fltd_Max_PK determined in step 68. If %_Mean_Fltd_Max_PK is less than or equal to ten (which means Max_Threshold and Min_Threshold are reasonably close in value) (step 72), then:

Thrsh10=Min(Max_Threshold and Min_Threshold)− 2*(|Max_Threshold−Min_Threshold|)(step 74).

If %_Mean_Fltd_Max_PK is greater than ten (step 72), then:

Thrsh10=Min(Max Threshold and Min Threshold)− (|Max Threshold−Min Threshold|)(step 76)

and the method proceeds to step 78.

If %_Diff_Threshold (calculated at step 68) is greater than 40 (step 78), then $$Threshold = Mid\_Threshold = \frac{(Threshold\_multiplier* (Max\_Threshold + Min\_Threshold)}{2}$$

where Threshold_multiplier is a user-selectable value between 0 and 1 (step 80). In preferred embodiments, the value used is 1. If %_Diff_Threshold (calculated at step 68) is less than or equal to 40 (step 78), then the method proceeds to step 82.

If %_Mean_Fltd_Max_PK is greater than or equal to 0.5 (step 82), then

Threshold=Thrsh10 (step 84).

If %_Mean_Fltd_Max_PK is less than 0.5 (step 82), then

Threshold=0.67*Min(Max_Threshold and Min_Threshold) (step 86).

Generally, %_Mean_Fltd_Max_PK is less than 0.5 when data is very steady and the values of the peaks are all about the same amplitude.

Referring back to step 52 of FIG. 3, if Adj/Filter_CF_RMS is less than three and peaks were discarded from the statistical analysis of the maximum peaks in Deriv>0_WF (step 70), then the method proceeds to step 88. If %_Diff_Threshold is less than or equal to 40 (step 88), then Threshold=0.5×Min Δ+Min_base_value (step 90).

If %_Diff_Threshold is greater than 40 (step 88), then

Threshold=Min_Threshold (step 92).

It should be noted that if peaks are discarded, then there are peaks in the original "number of peaks for analysis" which are statistical outliers (values greater than μ±nσ).

Referring again to step 52 of FIG. 3, if Adj/Filter_C-F_RMS is greater than or equal to three and no peaks were discarded from statistical analysis of the maximum peaks in Deriv>0_WF, then the Deriv>0_WF waveform is used as the tachometer signal and to set the threshold (step 54) according to:

Threshold=μ+2σ (step 94)

where μ and σ are calculated from the N peaks of the Deriv>0_WF waveform.

Tables 1 and 2 provide a summary of the threshold calculation.

TABLE 1

| Data Calculations | Calculations to determine Threshold | | | | | |
|---|---|---|---|---|---|---|
| Filtered_WF_CF_RMS (step 20) Deriv_CF_RMS (step 24) Deriv > 0_CF_RMS (step 34) Adj_Deriv > 0_CF_RMS (step 40) | Equivalent Value | Equivalent Value | Equivalent Value | Values Differ | Values Differ | Values Differ |
| $\frac{Adj\_Deriv > 0\_CF\_RMS}{Filtered\_WF\_CF\_RMS}$ (step 52) | ≥3 | | <3 | ≥3 | | <3 |
| Percent Difference Threshold (step 88) | | ≤40% | >40% | | ≤40% | >40% |

TABLE 1-continued

| Data Calculations | Calculations to determine Threshold | | | | |
|---|---|---|---|---|---|
| Threshold Value | $\mu + 2\sigma$ for Deriv > 0_WF | See Table 2. | Mid_Threshold | Bad Data | 0.5*MinΔ + Base Value | Min_Threshold |

TABLE 2

| Percent Mean Filtered Max Peak | Threshold Value |
|---|---|
| <0.5 | 0.67 * Min(Max_Threshold and Min_Threshold) |
| ≥0.5 and ≤10 | Min of (Max_Threshold and Min_Threshold) − 2*(|Max_Threshold − Min_Threshold|) |
| >10 | Min(Max_Threshold and Min_Threshold) − (|Max_Threshold − Min_Threshold|) |

Method to Determine the Number (N) of Peaks for Analysis

Following is a preferred embodiment of a routine for determining the number of largest peaks in a given waveform necessary to effectively evaluate data for determination of a threshold level. To calculate the number peaks (N) for analysis:

```
If (Filter_WF_Kurtosis > Deriv_CF_RMS) AND
    (Deriv>0_CF_RMS > Deriv_CF_RMS) AND
    (Deriv>0_CF_RMS > Filter_WF_Kurtosis) THEN
    Peak Multiplier = 1.5
Else
    Peak Multiplier = 0.75
Endif
    N = [Integer value (rounded up) of ((Peak Multiplier) × (Cycles of RPM))]
where:
    Filter_WF_Kurtosis is the kurtosis of the filtered waveform. Kurtosis is an indication of the
        shape of the distribution of data. A value of 3 represents a normal distribution.
        Values less than 3 indicate flatter distributions. Values greater than 3 indicate a
        sharper (more narrow) distribution.
    Deriv_CF_RMS is the crest factor calculated from the waveform produced by taking the
        derivative of the filtered waveform (Deriv_WF) as calculated above in step 24.
    Deriv>0_CF_RMS is the crest factor calculated form the waveform produced from derivative
        values greater than zero (Deriv>0_WF) as calculated above in step 34.
    Peak Multiplier is the value used to scale the final number of peaks for analysis.
    Cycles of RPM is the number of RPM cycles present in a given waveform, calculated as:
        Cycles of RPM = Sampling Rate (sec) × (Rated Speed (RPM) / 60)
```

Methods for Sorting Out Statistical Outliers

The following routine takes an array of data values and discards values outside the statistically calculated boundaries. In a preferred embodiment, there are four methods or criteria for setting the boundaries.

Method 1: Non-Conservative, Using Minimum and Maximum Statistical Boundaries

Consider an array of P values (or elements) where $P_0$ represents the number of values in the present array under evaluation. Now let $P_{-1}$ represent the number of values in the array evaluated a single step before $P_0$, let $P_{-2}$ represent the number of values in the array evaluated a single step before $P_{-1}$, and let $P_{-3}$ represent the number of values in the array evaluated a single step before $P_{-2}$.

Step 1:

```
While evaluating the array of values for either the first time or P_0 ≠ P_{-1},
{
    Calculate the mean (μ) and standard deviation (σ) for P_0
```

```
    If n\sigma/μ ≥ x, where x = 0.1 and n = 1, 2 or 3 in the
preferred embodiment, then
        Include array values such that
            μ − nσ < values < μ + nσ
    Else
        STOP, values are within statistical boundaries.
    Endif
}
```

Step 2:

```
If P_0 = P_{-1}, then
    While P_{-1} ≠ P_{-2}, and P_0 = P_{-1}
    {
        Calculate the mean (μ) and standard deviation (σ) for P_0
```

```
        If nσ/(2μ) ≥ x, where x = 0.1 and n = 1, 2 or 3 in the
    preferred embodiment, then
            Include array values such that
                μ − nσ/2 < values < μ + nσ/2
        Else
            STOP, values are within statistical boundaries.
        Endif
    }
Endif
```

Step 3:

```
If P_0 = P_{-1} = P_{-2}, and P_{-2} ≠ P_{-3}, then
    Calculate the mean (μ) and standard deviation (σ) for P_0
    Include array values such that
```

0.9μ < values < 1.1μ
    Else
        STOP, values are within statistical boundaries.
    Endif Method 2: Non-Conservative, Using Maximum Statistical Boundary Only (No Minimum Boundary)

Use the same procedure as in Method 1 except only values exceeding the upper statistical boundaries are discarded. The minimum boundary is set to zero.

Method 3: Conservative, Using Minimum and Maximum Statistical Boundaries

Discard values based on Method 1, Step 1 only.

Method 4: Conservative, Using Maximum Statistical Boundary Only (No Minimum Boundary)

Discard values based on Method 1, Step 1 only and based on values exceeding the upper statistical boundaries. The minimum boundary is set to zero.

Example of Method 1 for Sorting Out Statistical Outliers

As an example of the sorting Method 1, consider an original set of values, $P_0$, containing the 21 values listed below in Table 3 below, with n=1.

TABLE 3

| |
|---|
| 0.953709 |
| 0.828080 |
| 0.716699 |
| 0.653514 |
| 0.612785 |
| 0.582031 |
| 0.579209 |
| 0.557367 |
| 0.545801 |
| 0.495215 |
| 0.486426 |
| 0.486053 |
| 0.475123 |
| 0.472348 |
| 0.467129 |
| 0.465488 |
| 0.446327 |
| 0.440497 |
| 0.437959 |
| 0.427256 |
| 0.411627 |

The mean (μ) of this original set, $P_0$, is 0.54955 and standard deviation (σ) is 0.13982. Therefore, in Step 1 of Method 1, $$\frac{n\sigma}{\mu} = 1 * \frac{0.13982}{0.54955} = 0.25442.$$

Since 0.25442 is greater than 0.1, calculate $$\mu - n\sigma = 0.54955 - 1*0.13982 = 0.409735$$

and $$\nu + n\sigma = 0.54955 + 1*0.13982 = 0.689373.$$

Next, define the set $P_{-1} = P_0$ and define a new set $P_0$, the values of which are all the values of $P_{-1}$ that are between the values $\mu+\sigma=0.689343$ and $\mu-\sigma=0.409735$. The set $P_0$ now contains the values listed below in Table 4, wherein three outlier values have been eliminated.

TABLE 4

| |
|---|
| 0.653514 |
| 0.612785 |
| 0.582031 |
| 0.579209 |
| 0.557367 |
| 0.545801 |
| 0.495215 |
| 0.486426 |
| 0.486053 |
| 0.475123 |
| 0.472348 |
| 0.467129 |
| 0.465488 |
| 0.446327 |
| 0.440497 |
| 0.437959 |
| 0.427256 |
| 0.411627 |

Since $P_0 \neq P_{-1}$, Step 1 is repeated, where for the set $P_0$:

μ=0.50234,

σ=0.06946,

σ/μ=0.138263,

μ+σ=0.571797, and

μ-σ=0.432887.

Now define the set $P_{-2}=P_{-1}$, and $P_{-1}=P_0$ and define a new set $P_0$, the values of which are all the values of $P_{-1}$ that are between the values μ+σ=0.571797 and μ-σ=0.432887. The set $P_0$ now contains the values listed below in Table 5, wherein four more outlier values have been eliminated.

TABLE 5

| |
|---|
| 0.557367 |
| 0.545801 |
| 0.495215 |
| 0.486426 |
| 0.486053 |
| 0.475123 |
| 0.472348 |
| 0.467129 |
| 0.465488 |
| 0.446327 |
| 0.440497 |
| 0.437959 |

Since $P_0 \neq P_{-1}$, Step 1 is repeated, where for the set $P_0$:

μ=0.481311,

σ=0.037568, and

σ/μ=0.078053.

Since

σ/μ=0.078053≤0.1, all the members of the array $P_0$ are statistically close in value and need no more sorting.

If at any point in the calculations $P_0=P_{-1}$ and $P_{-1} \neq P_{-2}$, then Step 2 would be executed instead of Step 1. In the example above, since $P_0 \neq P_{-1}$ for every iteration, only Step 1 was necessary for the calculations.

The foregoing description of preferred embodiments for this invention have been presented for purposes of illustration and description. They are not intended to be exhaustive or to limit the invention to the precise form disclosed.

Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for determining a threshold value for a tachometer signal generated by a tachometer attached to a particular machine, wherein the determined threshold value is used to reliably trigger tachometer pulses for the particular machine based on rising or falling edges of the tachometer signal the method comprising:
    (a) attaching the tachometer in proximity to a rotating component of the particular machine, wherein due to a lack of reflective tape or other distinctive feature on the rotating component, the tachometer signal is noisy and the tachometer pulses are not distinct from the noise;
    (b) the tachometer generating the tachometer signal that includes pulses which are indicative of a rotational speed of the rotating component, wherein the tachometer signal includes some peak values associated with the pulses and some peak values associated with noise, wherein due to the variations in the peak values, the threshold value determined for the particular machine will be different than a threshold value determined for another machine;
    (c) a low-pass filter filtering the tachometer signal to remove high-frequency noise, thereby producing a filtered tachometer signal;
    (d) a processor determining a characteristic of the filtered tachometer signal that indicates a relative amplitude of the peak values in the filtered tachometer signal compared to a mean value of the filtered tachometer signal;
    (e) the processor taking a running derivative of the filtered tachometer signal to generate a derivative signal that includes peak values associated with steep slopes in the filtered tachometer signal, which peak values indicate the pulses in the tachometer signal as opposed to the peak values associated with noise, the peak values in the derivative signal thereby making the pulses more distinctive than they are in the tachometer signal generated in step (b) and therefore easier to identify for use in determining the threshold value;
    (f) the processor determining a characteristic of the derivative signal that indicates a relative amplitude of the peak values in the derivative signal compared to a mean value of the derivative signal;
    (g) the processor calculating a characteristic ratio, which is a ratio of the characteristic of the derivative signal to the characteristic of the filtered tachometer signal;
    (h) the processor comparing the characteristic ratio to a predetermined value;
    (i) based on the comparing of step (h), the processor:
        (i1) using the filtered tachometer signal to derive the threshold value for the tachometer pulses in the tachometer signal if the characteristic ratio is less than the predetermined value; or
        (i2) using the derivative signal to derive the threshold value for the tachometer pulses generated from the derivative signal if the characteristic ratio not less than the predetermined value; or
        (i3) determining that a meaningful threshold value cannot be derived due to insufficient information in the tachometer signal;
    (j) detecting tachometer pulses based on rising or falling edges of the tachometer signal that exceed the threshold value derived in step (i);
    (k) determining a rotational speed of the particular machine based on the tachometer pulses detected in step (j); and
    (l) analyzing vibration data collected from the particular machine using the rotational speed determined in step (k).

2. The method of claim 1 wherein the characteristic of the filtered tachometer signal is a crest factor of the tachometer signal, the characteristic of the derivative signal is a crest factor of the derivative signal, and the characteristic ratio is a ratio of the crest factor of the derivative signal to the crest factor of the filtered tachometer signal.

3. The method of claim 2 wherein the predetermined value is 3.

4. The method of claim 1 further comprising the processor performing the following steps after step (e) and before step (f):
    (e1) determining a mean value and a standard deviation value of the derivative signal;
    (e2) setting all negative values in the derivative signal to zero to generate an all-positive-value derivative signal;
    (e3) finding N number of peaks in the all-positive-value derivative signal; and
    (e4) discarding statistical outlier peaks from the N number of peaks in the all-positive-value derivative signal, wherein the statistical outlier peaks have an amplitude greater than a sum of the mean value and the standard deviation value,
wherein step (f) comprises the processor determining a characteristic of the all-positive-value derivative signal from which the outlier peaks have been discarded.

5. The method of claim 4 further comprising the processor determining that a threshold value cannot be derived from the derivative signal if statistical outlier peaks were discarded in step (e4).

6. A method for determining a threshold value for a tachometer signal generated by a tachometer attached to a machine, the tachometer signal including pulses that are indicative of a rotational speed of a rotating component of the machine, wherein due to a lack of reflective tape or other distinctive feature on the rotating component, the tachometer signal is noisy and the pulses within the tachometer signal are not distinctive, wherein the threshold value is for use in detecting the pulses in analysis of machine vibration data, the method comprising:
    (a) the tachometer generating the tachometer signal that includes some peak values associated with the pulses in the tachometer signal and some peak values associated with noise;
    (b) a low-pass filter filtering the tachometer signal to remove high-frequency noise, thereby producing a filtered tachometer signal;
    (c) a processor taking a running derivative of the filtered tachometer signal to generate a derivative signal that includes peak values associated with steep slopes in the filtered tachometer signal, which peak values indicate the pulses in the tachometer signal as opposed to peak values associated with noise, the peak values in the derivative signal thereby making the pulses more distinctive than they are in the tachometer signal generated in step (a);

(d) the processor determining a mean value and a standard deviation value of the derivative signal;
(e) the processor setting all negative values in the derivative signal to zero to generate an all-positive-value derivative signal;
the processor finding N number of peaks in the all-positive-value derivative signal;
(g) the processor discarding statistical outlier peaks from the N number of peaks in the all-positive-value derivative signal, wherein the statistical outlier peaks have an amplitude greater than a sum of the mean value and the standard deviation value;
(h) the processor determining a characteristic of the all-positive-value derivative signal from which the statistical outlier peaks have been discarded;
(i) based on the characteristic, the processor determining that:
the filtered tachometer signal is to be used to derive a threshold value for tachometer pulses in the tachometer signal; or
the derivative signal is to be used to derive a threshold value for tachometer pulses in the derivative signal;
(j) the processor using the filtered tachometer signal or the derivative signal as determined in step (i) to derive a threshold value for tachometer pulses in the tachometer signal; and
(k) the processor generating tachometer pulses based on the tachometer signal and the threshold value derived in step (j).

7. An apparatus for determining a tachometer threshold value for use in analysis of machine vibration data, the apparatus comprising:
a tachometer attached adjacent a rotational component of a machine, the tachometer for generating an analog tachometer signal including pulses that are indicative of rotational speed of the rotational component, wherein due to a lack of reflective tape or other distinctive feature on the rotating component, the tachometer signal is noisy and the pulses are not distinctive, wherein some peak values in the analog tachometer signal are associated with the pulses and some peak values in the analog tachometer signal are associated with noise, wherein the threshold value is for use in detecting the pulses in analysis of machine vibration data;
a vibration data collector comprising:
an analog-to-digital converter for converting the analog tachometer signal into digital tachometer data;
a low-pass filter for filtering the digital tachometer to remove high-frequency noise, thereby producing filtered tachometer data; and
memory for buffering the filtered tachometer data; and
a vibration data processor for executing operational instructions to:
determine a first crest factor based on the filtered tachometer data;
take a running derivative of the filtered tachometer data to generate derivative data that includes peak values associated with steep slopes in the filtered tachometer data, which peak values indicate the pulses in the tachometer signal as opposed to peak values associated with noise, the peak values in the derivative data thereby making the pulses more distinctive than they are in the filtered tachometer data;
determine a second crest factor based on the derivative data;
calculate a characteristic ratio, which is a ratio of the second crest factor to the first crest factor;
compare the characteristic ratio to a predetermined value;
if the characteristic ratio is less than the predetermined value, use the filtered tachometer data to derive the tachometer threshold value for tachometer pulses in the tachometer signal;
if the characteristic ratio is not less than the predetermined value, use the derivative data to derive the tachometer threshold value for tachometer pulses in the tachometer signal; and
generate tachometer pulses based on the tachometer signal and the tachometer threshold value.

8. The apparatus of claim 7 wherein the vibration data processor executes operational instructions to:
determine a mean value and a standard deviation value of the derivative data;
set all negative values in the derivative data to zero to generate all-positive-value derivative data;
find N number of peaks in the all-positive-value derivative data;
discard statistical outlier peaks from the N number of peaks in the all-positive-value derivative data, wherein the statistical outlier peaks have an amplitude greater than a sum of the mean value and the standard deviation value; and
determine the second crest factor based on the all-positive-value derivative data from which the outlier peaks have been discarded.

9. The apparatus of claim 7 wherein the vibration data collector comprises a digital data recorder.

10. The apparatus of claim 7 wherein the vibration data processor is a component of the vibration data collector.

11. A method for determining a threshold value for a tachometer signal generated by a tachometer attached to a machine, wherein the determined threshold value is used to detect tachometer pulses for the machine based on the tachometer signal, wherein the tachometer signal includes some peak values associated with the tachometer pulses and some peak values associated with noise, the method comprising:
(a) low-pass filtering the tachometer signal to remove high-frequency noise, thereby producing a filtered tachometer signal;
(b) using a processor, determining a characteristic of the filtered tachometer signal that indicates a relative amplitude of the peak values in the filtered tachometer signal compared to a mean value of the filtered tachometer signal;
(c) using the processor, taking a running derivative of the filtered tachometer signal to generate a derivative signal that includes peak values associated with steep slopes in the filtered tachometer signal, which peak values indicate the pulses in the tachometer signal as opposed to the peak values associated with noise;
(d) using the processor, determining a characteristic of the derivative signal that indicates a relative amplitude of the peak values in the derivative signal compared to a mean value of the derivative signal;
(e) using the processor, calculating a characteristic ratio, which is a ratio of the characteristic of the derivative signal to the characteristic of the filtered tachometer signal;

(f) using the processor, comparing the characteristic ratio to a predetermined value;
(g) based on the comparing of step (f), the processor:
(g1) using the filtered tachometer signal to derive the threshold value for the tachometer pulses in the filtered tachometer signal if the characteristic ratio is less than the predetermined value; or
(g2) using the derivative signal to derive the threshold value for the tachometer pulses generated from the derivative signal if the characteristic ratio not less than the predetermined value;
(h) detecting tachometer pulses based on rising or falling edges of the tachometer signal that exceed the threshold value derived in step (g); and
(i) determining a rotational speed of the particular machine based on the tachometer pulses detected in step (h).

* * * * *